United States Patent Office 3,528,098
Patented Sept. 8, 1970

3,528,098
BRIDGED POLY(BENZOFURAZAN OXIDES)
John T. Shaw, Grove City, Pa., assignor to American Cyanamid Company, Stamford, Conn., a corporation of Maine
No Drawing. Application Aug. 30, 1965, Ser. No. 483,756, now Patent No. 3,260,621, which is a continuation-in-part of application Ser. No. 237,811, Nov. 15, 1962, now abandoned. Divided and this application Feb. 15, 1966, Ser. No. 527,493
Int. Cl. C07d 85/48
U.S. Cl. 260—307                 4 Claims

ABSTRACT OF THE DISCLOSURE

A bridge poly(benzofurazan oxide) of the general formula:

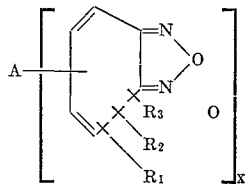

where $R_1$, $R_2$ and $R_3$ are hydrogen, lower alkyl, lower alkoxy, chloro or nitro, or two are a second furazan ring; and A is a bridging link, having $x$ valence bonds, each attached to separate benzo rings, and $x$ is 2, 3 or 4, is prepared by the azide decomposition of an ortho-nitro-azido compound, or the oxidative ring closure of an ortho-nitro-amino compound. The A may be sulfone, carbonyl, azo, ether, —CH$_2$— or other linkage.

The compounds are depolarizers for battery cells, or fungistatic agents.

CROSS REFERENCES TO RELATED APPLICATIONS

This is a divisional of application Ser. No. 483,756, filed Aug. 30, 1965, now U.S. Pat. No. 3,260,621, which is in turn a continuation-in-part of application Ser. No. 237,811, filed Nov. 15, 1962 now abandoned.

This invention relates to polyfurazan oxides which have at least one furazan oxide moiety attached to each of at least two benzo rings, with the benzo rings being linked by a bridge group. These compounds are particularly useful as depolarizers in a dry cell cathode mixture.

The benzo rings may contain additional substituents, such as lower alkyl groups, lower alkoxy groups, chloro groups, or nitro groups. The present compounds have fungistatic activity, and such substituents are apt to have more effect in changing fungistatic activity than on dry cell utility.

Nomenclature in the field is varied. The compounds can be considered as derivatives of oxides of benzofurazan, listed as number 1058 in "The Ring Index," 2nd. Edition, A. M. Patterson, L. T. Capell and D. F. Walker, American Chemical Society, Washington, D.C., 1960 (abbreviated R.R.I.). R.R.I. number 2167, benzofuroxan or benzofurazan oxide is also listed in that index. Conventional nomenclature and formulae are somewhat confusing, as the furazan ring shares electrons with the benzene ring, and would indicate that the benzenoidal conjugation is destroyed. Actually, the benzenoid ring remains aromatic in character, even if some electrons are shared with the furazan ring or rings.

The nomenclature here used is regarded as the most informative feasible, it being understood that the electrons are in motion, and must be considered as a cloud, with the exact location not fixed. Hence, a compound is not fully represented by any static structural formula.

A review of the literature, including history and nomenclature, appears in "The Furoxans," J. V. R. Kaufman and J. P. Picard, Chem. Reviews, 59, 429 (1959).

Benzofurazan 3-oxide has the formula and numbering:

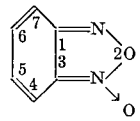

Usage places the dative bonded oxygen in the 3 position, with other substituents in the lowest numbered position. In unsubstituted compounds at least, the 5 and 6 positions appear equal, as do the 4 and 7. The dative bonded oxygen appears to be labile and behaves as if at either position 1 or 3, and hence could be named as 1-oxide, 3-oxide or N-oxide.

Formulae and nomenclature in the field are somewhat in a state of flux. If later theory indicates a different structural representation to be more informative, the present inventors incorporate any such theoretical changes, as it is the compounds themselves, and their usage, that are the present invention, and not a structural representation of such compounds.

The new compounds of the invention comprises benzofurazan 3-oxide derivatives with more than on benzofurazan 3-oxide moiety linked together through a bridging linkage of valence $x$, where $x$ is an integer from 2 to 4, and may be represented by the formula:

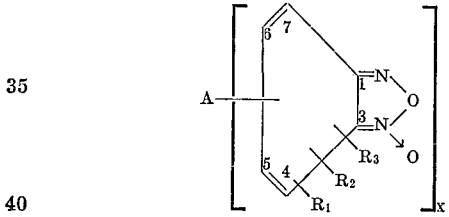

were $R_1$, $R_2$ and $R_3$ are singly each selected from the group consisting of hydrogen, lower alkyl, lower alkoxy, chloro and nitro radicals, and any two adjacent may be a second furazan ring; and A is a bridging linkage having $x$ valence bonds each linked to separate benzorings, and $x$ is a small whole number not less than 2 and not greater than 4.

The bridging linkages are exemplified by the following where each valence bond shown open is attached to the benzene ring of a benzofurazan 3-oxide group:

| | |
|---|---|
| Sulfone | —SO$_2$— |
| Carbonyl | $-\overset{\overset{\displaystyle O}{\|}}{C}-$ |
| Azo | —N=N— |
| Ether (oxy) | —O— |
| Phosphinylidyne (phosphine oxide) | $-\overset{\overset{\displaystyle O}{\|}}{\underset{\|}{P}}-$ |
| Arsine oxide | $-\overset{\overset{\displaystyle O}{\|}}{\underset{\|}{As}}-$ |

Structures only are indicated for the following groups.

| | |
|---|---|
| —H$_2$C-CH$_2$— | $\underset{-N-}{\overset{NO}{\|}}$ |
| —CH=CH— | $\underset{-N-}{\overset{NH_2}{\|}}$ |

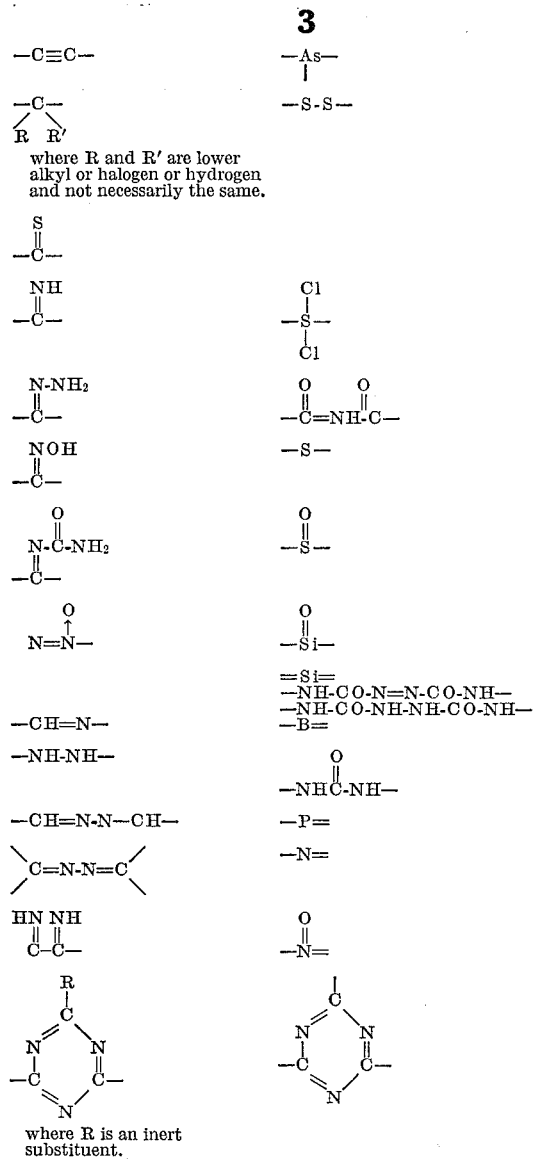

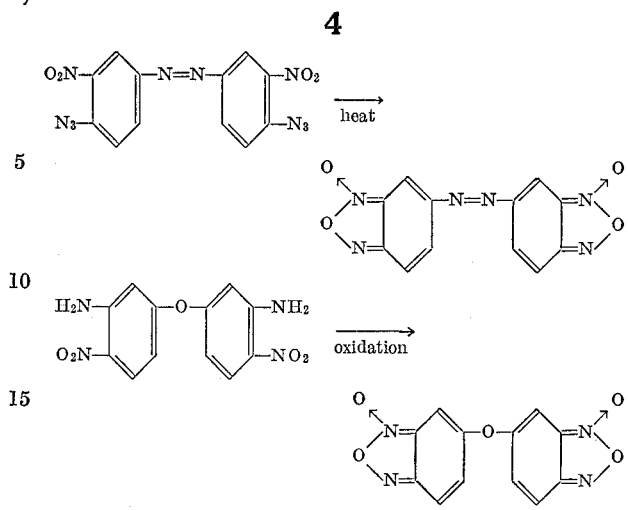

For those compounds having more than one furazan ring attached to a single benzene ring, caution in synthesis and handling is advised, as the compounds tend to decompose with explosive violence. In dry cells, the admixed carbon and electrolyte reduce the risk of explosion. In other usage, other carriers can reduce risks of explosion.

Representative of compounds which give good results in dry cells, and are readily synthesized, are:

5,5'-sulfonylbisbenzofurazan 3,3'-dioxide,
5,5'-bisbenzofurazan 3,3'-dioxide,
5,5'-methylenebisbenzofurazan 3,3'-dioxide,
5,5'-carbonylbisbenzofurazan 3,3'-dioxide,
5,5'-azobisbenzofurazan 3,3'-dioxide,
5,5'-oxybisbenzofurazan 3,3'-dioxide,
5,5',5''-phosphinylidynetribenzofurazan 3,3'-dioxide, and
5,5',5''-arsineoxidetrisbenzofurazan 3,3'-dioxide.

There are two general methods which may conveniently be applied for preparation of these compounds. One method involves the azide decomposition of an ortho-nitro-azido compound. The other method involves the oxidative ring closure of an ortho-nitro-amino compound, using an oxidizing agent such as sodium hypochlorite.

Example 1.—Preparation of 5,5'-sulfonylbisbenzofurazan 3,3'-dioxide

To a stirred mixture of 300 ml. concentrated $H_2SO_4$ and 250 ml. of 90% nitric acid was added gradually in portions, 50 g. of bis(p-chlorophenyl) sulfone, keeping the temperature between 25 and 40° C. during the addition. The mixture was then stirred at about 60° C. for an hour and after cooling to 55° C., was drowned into about 2 liters of cracked ice. The white precipitate which formed was removed by filtration and dried. This was then recrystallized from 750 ml. of glacial acetic acid giving 55 g. of bis(4-chloro-3-nitrophenyl) sulfone with a melting point of 196 to 198° C.

The chloro-nitro compound was then converted to the azido-nitro compound. A solution of 34.8 g. of bis(4-chloro-3-nitrophenyl) sulfone in 200 ml. of dimethylsulfoxide was treated dropwise with 20 ml. of water at 38 to 40° C. To this thin slurry which formed was then added at this temperature 14.4 g. sodium azide in portions over one-half hour. The yellow-orange slurry which slowly formed was then stirred at 35 to 37° C. for about three hours and was then poured into a liter of cold water. The solid which formed was isolated by filtration, washed with water and dried giving the bis(4-azido-3-nitrophenyl) sulfone (34 g.) as a yellow solid (M.P. 112–113° C., dec.).

To 40 ml. of toluene was added 20 g. of the azide compound prepared above. The mixture was warmed on a steam bath for about three hours, with evolution of nitrogen; during the first one-half hour, the evolution of nitrogen took place to such an extent that there was considerable bubbling and foaming. The mixture was then chilled and the solid product was isolated by filtration, washed and dried giving 5,5'-sulfonyl-bis-benzofurazan 3,3'-dioxide (16 g.) as a yellow solid (M.P. 207–209° C.).

Example 2.—Preparation of 5,5'-bis-benzofurazan 3,3'-dioxide

A 100 g. crude sample of 3,3'-dinitrobenzidine (M.P. 248–263°) was purified by slurrying with 500 ml. of hot concentrated hydrochloric acid, filtering hot, reslurrying the wet cake in two liters of water, filtering and washing with water; yield: 96 g., M.P. 261–263°. 54 g. of this material was then recrystallized from 400 ml. of phenol to yield 42 g. of scarlet needles, M.P. 272–273° (literature 275°).

A solution of 27.4 g. (0.1 mole) of the recrystallized dinitrobenzidine in 200 ml. of concentrated sulfuric acid was poured over ice and water, approximately 2 liters, stirred and the finely-divided precipitate was filtered. The cake was washed with approximately one liter of water, sucked damp and then stirred with 100 ml. of 40% caustic. The smooth paste which formed was treated with 110 ml. of approximately 12% sodium hypochlorite and gradually heated over 30 minutes to a gentle boil with stirring. The dark red slurry gradually became lighter and finally turned yellow. During an additional 20 minutes of heating at 95 to 105°, 90 ml. more of the hypochlorite solution was added. The mixture was cooled, filtered and air dried, yielding 23.0 g. (85%) of a yellow solid, M.P. 203–204°, dec. Recrystallization from 400 ml. of chlorobenzene gave 17.5 g. of 5,5'-bis-benzofurazan 3,3'-dioxide, an organic solid, M.P. 201–202° dec.

Example 3.—Preparation of 5,5'-methylene-bis-benzofurazan 3,3'-dioxide

A solution of 100 g. (0.725 mole) of o-nitroaniline in 1200 ml. of ethanol was treated with one liter of water and 54 g. of 37% low-methanol formaldehyde (0.667 mole). The mixture was then distilled at such a rate that approximately four hours were required to collect 930 ml. of distillate. The residue of N,N'-methylene-bis-o-nitroaniline was chilled, filtered and air dried, yielding 99 g. (94.7%) of a yellow solid, M.P. 187–189°.

A slurry of 91 g. of this material and 910 g. (765 ml.) of concentrated HCl was heated on the steam bath for 1.5 hours during which time a gentle stream of hydrogen chloride gas was bubbled into the mixture. After cooling to room temperature, the mixture was again saturated with hydrogen chloride gas and then allowed to stand for one week. The precipitate was filtered at room temperature and the damp cake was heated to boiling in one liter of water, filtered hot and the cake first air, then oven dried at 60° C., yielding 62 g. (68%), M.P. 222–226°, of 4,4'-diamino-3,3'-dinitrodiphenylmethane.

A warm slurry of 39.2 g. (0.136 mole) of 4,4'-diamino-3,3'-dinitrodiphenylmethane in 600 ml. of a solution of acetic acid/sulfuric acid, 2/1, was cooled in an ice bath to 10° and then sufficient ice was added to the mixture to lower the temperature to approximately 3° (the external temperature being about 2°). Sodium nitrite, 20.0 g. (0.29 mole), was then added in portions at 2–4° over one-half hour (ice being added when necessary) and the mixture was stirred for an additional three-quarters of an hour at 0±2°, filtered and the stirred purple-colored solution after being cooled to 0° was treated with a solution of 18.8 g. of sodium azide in 60 ml. of water. The mixture foamed a little and the stirring at 0–5° was continued for 20 minutes followed by filtration and water washing. The air-dried 4,4'-diazido-3,3'-dinitrodiphenylmethane weighed 40 g. (86.5%), and melted at 118–119° dec.

A mixture of 20 g. of this diazide and 40 ml. of toluene was heated on the steam bath for three hours, cooled, collected and then taken up in 300 ml. of boiling toluene and filtered hot. The filtrate was drowned in hexane and the orange precipitate which formed was isolated, washed with hexane and air-dried giving 6.5 g. (38.9%), M.P. 176–178° dec. of 5,5'-methylenebisbenzofurazan 3,3'-dioxide.

Analogous results are obtained starting with appropriate compounds having as substituents lower alkyl, lower alkoxy and chloro radicals.

Example 4.—Preparation of 5,5'-carbonylbis-benzofurazan 3,3'-dioxide

To a stirred solution of 150 ml. of 90% fuming nitric acid was added 25 g. of 4,4'-dichlorobenzophenone at 5–7°. The green solution which formed was allowed to warm to room temperature, stand overnight and then poured over ice (one-liter beaker ¾ full). The solid was collected, washed with water and dried at 60°, yielding 31.4 g., M.P. 126–130°. Recrystallization from 160 ml. of glacial acetic acid gave 26.6 g., M.P. 129–131°, of 4,4'-dichloro-3,3'-dinitrobenzophenone.

A solution of 17.05 g. (0.05 mole) of 4,4'-dichloro-3,3'-dinitrobenzophenone in 110 ml. of dimethyl sulfoxide and 11 ml. of water was treated portionwise with 8.13 g. (0.125 mole) of sodium azide over a 25-minute period at 40–44°. The mixture, after stirring for an additional 2½ hours, was poured into 500 ml. of water, chilled, filtered, washed with water and air-dried. The 4,4'-diazido-3,3'-dinitrobenzophenone weighed 17.7 g. and melted at 116–117° dec.

A mixture of 15 g. of said diazide and 30 ml. of toluene was heated on the steam bath for 2¼ hours; there was considerable foaming. Chilling, followed by filtration and washing the cake with hexane gave 11.2 g., M.P. 191–193° dec. of 5,5'-carbonylbisbenzofurazan 3,3'-dioxide.

Example 5.—Preparation of 5,5'-oxy-bis-benzofurazan 3,3'-dioxide

A mixture of 50 g. of p-nitrophenyl ether, 200 ml. dimethylformamide and 2 g. of 10% palladium on carbon was hydrogenated in a Parr apparatus. The total hydrogen absorption was 105 p.s.i., theory 92 p.s.i. The mixture was filtered to remove the catalyst and the filtrate drowned in water. The white solids after filtering, washing with water and oven drying at 60° yielded 35.5 g., M.P. 184–185°, of p-aminophenyl ether.

The p-aminophenyl ether thus produced was acetylated by treating 35 g. (0.175 mole) thereof in 160 ml. of 3/2.2 (by volume) acetic acid/water at 0° with 36.3 ml. (0.39 mole) of acetic anhydride. The solution immediately solidified and a 20° heat of reaction was observed. The mixture was then heated to 90° with stirring, whereupon a thin slurry formed, and after heating a few minutes at this temperature was allowed to cool to room temperature, filtered and washed with water, yielding 46 g. of the diacetylated p-aminophenyl ether.

A mixture of 20 g. (0.7 mole) of the thus acetylated p-aminophenyl ether and 400 ml. of glacial acetic acid was cooled to 17° and then 100 ml. of concentrated sulfuric acid was added at 15–25°. The addition of the sulfuric acid caused a dark red solid to precipitate which finally redissolved by the time all the sulfuric acid was added. To this solution was added at approximately 15°, 9.5 ml. (0.15 mole) of 70% nitric acid; no heat of reaction was noticed and the mixture was allowed to stir at 10 to 20° for three hours and then at room temperature overnight. The solution was drowned in ice water, filtered, washed with water and steam oven dried at 60° for 48 hours, yielding 25 g., M.P. 194–199° (96% yield) of 4,4'-diacetylamino-3,3'-dinitrodiphenyl ether.

The deacetylation was carried out by taking 15 g. of the nitrated material and heating with 250 ml. of Claisen's alkali for three-quarters of an hour on the steam bath. (The Claisen's alkali was prepared by taking 88 g. (1.57 mole) of potassium hydroxide, dissolving in 63 ml. of water and then diluting the cooled solution to 250 ml. with methanol.) The tarry material which formed was drowned in water, filtered and recrystallized from acetic acid. The washed, oven dried material obtained after filtration and washing with ether, yielded 5.0 g., M.P. 205–207°, of 4,4'-diamino-3,3'-dinitrophenyl ether.

A 4.5 g. portion of 4,4'-diamino-3,3'-dinitrodiphenyl ether, prepared as above, was added to a solution of 10 g. of sodium hydroxide in 150 ml. of alcohol and the mixture was cooled to 0°. To this cold solution was added 23 ml. of approximately 14% sodium hypochlorite in portions at 0–5°. The rate of addition was controlled by the time taken to change from the initial red color back to the brownish orange color of the starting material. The mixture was then stirred for one hour in the cold, and the yellow-brown suspension was filtered, washed well with water and dried in vacuo at 55°, giving 3.7 g., M.P. 165–170° (84% yield) of 5,5'-oxy-bis-benzofurazan 3,3'-dioxide. Recrystallized from acetic acid and ethanol, a more highly purified sample melted at 170–172°.

Example 6.—Preparation of 5,5'-azo-bis-benzofurazan 3,3'-dioxide

A solution of 50 g. (0.29 mole) of 3-nitro-4-chloroaniline in 200 ml. of ethanol was cooled to 5° C. and 100 ml. of sodium hypochlorite (approximately 14%) was then added portionwise at 5–10°, over a period of approximately ¾ hour. The slurry of orange precipitate was stirred overnight, filtered and then washed with water and alcohol, yielding 14.5 g., M.P. 213–215°, of 3,3'-dinitro-4,4'-dichloroazobenzene.

A thin slurry of 10.2 g. (0.03 mole) of 3,3'-dinitro-4,4'-dichloroazobenzene, prepared as above, and 125 ml. of dimethylsulfoxide and 12.5 ml. of water at 45° was treated with 4.3 g. (0.066 mole) of sodium azide portionwise. After heating at 45–50° C. for six hours, 45 ml. of dimethylsulfoxide and 5 ml. of water, and 1 g. (0.015 mole) of sodium azide were added. The mixture was then stirred overnight at 43°, drowned in water and the solids collected. The dry cake was thought to be too sensitive to work with and so the wet cake was decomposed in about 200 ml. of toluene on the steam bath. Very little decomposition occurred until the temperature of 80° was reached. When the gas evolution ceased (pot temperature 100°), the dark red toluene solution was decanted away from the solids and drowned in hexane; the yellow-brown solid which precipitated was filtered off and air dried, giving 1.6 g., M.P. 196–197° dec., of 5,5'-azo-bis-benzofurazan 3,3'-dioxide.

Additional material may be isolated from the residue from the hot toluene decomposition by extraction with hot acetic acid precipitation by pouring into water.

Example 7.—Preparation of 5,5',5''-phosphinylidyne-tris-benzofurazan 3,3',3''-trioxide A stirred solution of 17 g. of p-chlorobromo-benzene in 70 ml. of anhydrous ether was treated with 9.72 g. (0.4 mole) magnesium turnings and gently warmed to aid the formation of the Grignard; a few magnesium turnings were crushed under a glass rod to aid the process. After about 15 minutes the reaction began and 69 g. of p-chlorobromobenzene in 200 ml. of ether was added at such a rate as to keep the mixture refluxing. The addition required one-half hour and the mixture was stirred at ambient temperature for two hours followed by a final ¾-hour refluxing. The mixture was cooled to 0° and a solution of 18.3 g. (0.12 mole) of redistilled phosphorus oxychloride in 125 ml. of ether was added over 1.5 hours at −2 to +1°. The mixture was then refluxed for two hours and upon cooling was poured over ice (3-liter beaker ⅓ full) containing a little dilute HCl. Approximately 300 ml. of ether was added to the mixture which was stirred and filtered, and the cake washed with ether. The ether filtrate and washings were dried over sodium sulfate and evaporated. The pasty residue was extracted with three 200-ml. portions of petroleum ether (60–90°) and the residue weighed 23.5 g. Recrystallization from 50 ml. of benzene gave 9.2 g., M.P. 166–169°, of tris(p-chlorophenyl)phosphine oxide.

A nitrating solution prepared by cautiously adding 25 ml. of 90% fuming nitric acid to 30 ml. of concentrated sulfuric acid at 25–40° was cooled to 8° and 5 g. (0.013 mole) of tris(p-chlorophenyl)phosphine oxide was added in portions over a one-half hour period. The temperature rose to 29° because of the heat of reaction. The amber solution became light yellow after being heated for one hour at 55–60° and upon cooling to room temperature was poured over ice and water, collected and dried in vacuo at 60°, yielding 6.4 g. (95%), M.P. 188–195°. Recrystallization from 75 ml. of chlorobenzene gave 4.8 g., M.P. 191–192°, of tris(4-chloro-3-nitrophenyl)phosphine oxide.

A stirred solution of 4 g. (0.0075 mole) of tris-(4-chloro-3-nitrophenyl)phosphine oxide in 25 ml. of dimethyl sulfoxide and 2.5 ml. of water was treated portionwise at 38–40° with 1.88 g. (0.0279 mole) of sodium azide. After approximately one-half the sodium azide was added, the precipitate which formed became so thick that the magnetic stirrer stopped; addition of 30 ml. more of dimethyl sulfoxide resulted in a stirrable slurry and the remainder of the sodium azide was then added at 37–40°. the mixture was stirred for four hours at 30–35° and then poured into 300 ml. water; the precipitate was collected and dried over $P_2O_5$, yielding 3.8 g. (91.5%) of tris(4-azido-3-nitrophenyl)phosphine oxide. The product decomposes on heating.

A mixture of 3.8 g. of the tris-azide and 22 ml. of Decalin was heated to 125° C. for 10 minutes using an oil bath and the cream-colored mixture turned yellow with evolution of gas. After heating at 138–140° for three hours, the mixture was cooled, filtered and washed with hexane giving 2.7 g., M.P. 222° vigorous decomposition, of 5,5',5''-phosphinylidyne-tris-benzofurazan 3,3',3''-trioxide.

Example 8.—Preparation of 5,5',5''-arseneoxide-tris-benzofurazan 3,3',3''-trioxide A solution of 15 g. of tris-p-chlorophenylarsene (0.0366 mole) in 30 ml. of acetone was treated dropwise with 5.2 g. (0.0455 mole) of 30% hydrogen peroxide at 25–30° C. (cooling with ice was required). The solution was stirred for one hour at room temperature following completion of addition and the solvent was then stripped off in vacuo. The white solid tris-p-chlorophenylarseneoxide obtained weighed 15.2 g., M.P. 202–204°.

A nitrating solution was prepared by cautiously adding 38.2 ml. of 90% fuming nitric acid to 46 ml. of concentrated sulfuric acid at 8–35° C., was cooled to 3° and 8.5 g. (0.02 mole) of tris-p-chlorophenylarseneoxide was added in portions over a 10-minute period. The mixture was allowed to warm to 30° and then was heated at 55–60° for one hour and upon cooling to room temperature was poured over ice and water, collected and dried at 60° for 48 hours, giving 16.7 g. (11.2% theory), M.P. 230–232°, of tris(4-chloro-3-nitrophenyl)arsene oxide.

A stirred solution of 5.6 g. (0.01 mole) of tris-(4-chloro-3-nitrophenyl)arsene oxide in 60 ml. of dimethyl sulfoxide and 2 ml. of water was treated portionwise at 38–40° with 2.6 g. (0.04 mole) of sodium azide. After 30 minutes the precipitate which formed was quite heavy, although still stirrable; the mixture was stirred 40–50° for 3 hours and then overnight at 35–40°. The mixture was poured into approximately 5 ml. of ice water and filtered and the cake washed with water. The azide product, 8.5 g. of the wet cake and 30 ml. of o-dichlorobenzene was placed in an oil bath at 135°. The gas evolution began at 80° and continued over the interval from 80 to 105° C. The mixture was heated then at 110 to 130° for 2.5 hours and filtered hot. The cake of 5,5',5''-arseneoxide-tris-benzofurazan-3,3',3''-trioxide weighed 3.2 g., M.P. 226° with violent decomposition.

All temperatures are in centigrade unless otherwise indicated.

I claim:

1. A polybenzofurazan oxide compound of the formula:

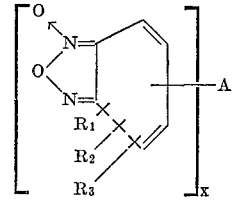

wherein $R_1$, $R_2$ and $R_3$ are singly each selected from the group consisting of hydrogen, lower alkyl, lower alkoxy, chloro and nitro radicals, and any two adjacent are a second furazan oxide ring; and A is a bridging linkage having $x$ valance bonds each linked to separate benzo rings selected from the group consisting of

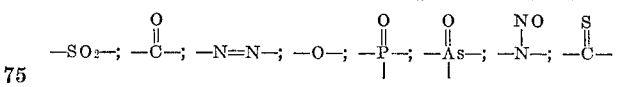

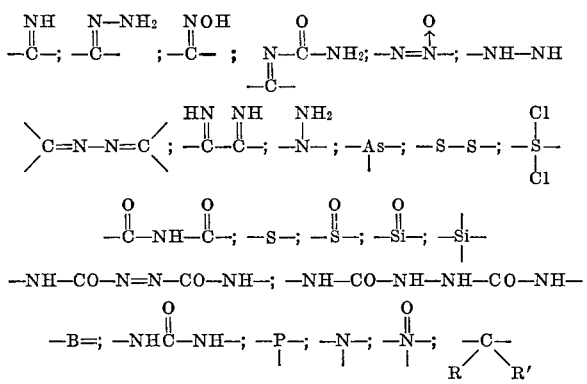

where R and R¹ are lower alkyl or halogen or hydrogen and not necessarily the same, and $x$ is a small whole number not less than 2 and not gerater than 4.

2. A compound of claim 1 which is 5, 5'-sulfonyl-bisbenzofurazan 3,3'-dioxide represented by the formula:

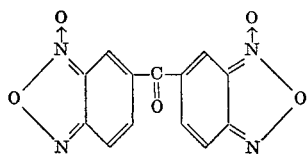

3. A compound of claim 1 which is 5,5'-carbonyl-bisbenzofurazan 3,3'-dioxide represented by the formula:

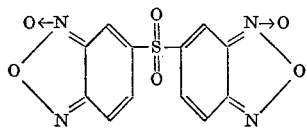

4. A compound of claim 1 which is 5,5'-oxybisbenzo-furazan 3,3'-dioxide represented by the formula:

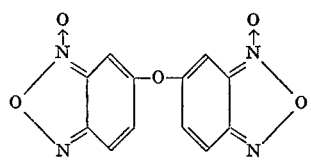

References Cited

FOREIGN PATENTS 1,374,790  11/1963  France.

OTHER REFERENCES

Green et al.: J. Chem. Soc. (London), 1913, pp. 2023–29.

ALEX MAZEL, Primary Examiner

R. J. GALLAGHER, Assistant Examiner

U.S. Cl. X.R.

260—157, 240, 248, 300, 999

UNITED STATES PATENT OFFICE
CERTIFICATE OF CORRECTION

Patent No. 3,528,098      Dated September 8, 1970

Inventor(s) JOHN T. SHAW

It is certified that error appears in the above-identified patent and that said Letters Patent are hereby corrected as shown below:

Column 2, line 28 "on" should read -- one --.

Column 3, line 16 "$-\overset{O}{\overset{\|}{C}}=NH-\overset{O}{\overset{\|}{C}}-$" should read -- $-\overset{O}{\overset{\|}{C}}-NH-\overset{O}{\overset{\|}{C}}-$ --.

Column 3, line 33 "-CH=N-N-CH-" should read -- -CH=N-N=CH --.

Column 8, Line 3 "the" should read -- The --.

Signed and sealed this 16th day of February 1971

(SEAL)
Attest:

EDWARD M. FLETCHER, JR.
Attesting Officer

WILLIAM E. SCHUYLER, JR.
Commissioner of Patents